(12) United States Patent
Chester et al.

(10) Patent No.: US 10,776,707 B2
(45) Date of Patent: Sep. 15, 2020

(54) LANGUAGE TRANSLATION BASED ON SEARCH RESULTS AND USER INTERACTION DATA

(71) Applicant: SHUTTERSTOCK, INC., New York, NY (US)

(72) Inventors: David Chester, Brooklyn, NY (US); Nathan Hurst, Seattle, WA (US)

(73) Assignee: Shutterstock, Inc., New York, NY (US)

( * ) Notice: Subject to any disclaimer, the term of this patent is extended or adjusted under 35 U.S.C. 154(b) by 355 days.

(21) Appl. No.: 15/064,523

(22) Filed: Mar. 8, 2016

(65) Prior Publication Data

US 2017/0262433 A1   Sep. 14, 2017

(51) Int. Cl.
  *G06N 7/00* (2006.01)
  *G06N 3/04* (2006.01)
  *G06N 3/08* (2006.01)
  *G06F 40/45* (2020.01)
  *G06N 20/00* (2019.01)

(52) U.S. Cl.
  CPC ............ *G06N 7/005* (2013.01); *G06F 40/45* (2020.01); *G06N 3/0454* (2013.01); *G06N 3/08* (2013.01); *G06N 20/00* (2019.01)

(58) Field of Classification Search
  CPC combination set(s) only.
  See application file for complete search history.

(56) References Cited

U.S. PATENT DOCUMENTS

| | | | | |
|---|---|---|---|---|
| 9,237,296 | B2* | 1/2016 | Jung | H04N 1/00448 |
| 2002/0038299 | A1* | 3/2002 | Zernik | G06F 17/30017 |
| 2004/0093374 | A1* | 5/2004 | Miyazaki | G06Q 30/06 709/203 |
| 2012/0059822 | A1* | 3/2012 | Malandain | G06F 17/30616 707/736 |
| 2013/0290320 | A1* | 10/2013 | Zhu | G06F 17/30979 707/723 |
| 2014/0350914 | A1* | 11/2014 | Andrade Silva | G06F 17/2818 704/2 |
| 2015/0161238 | A1* | 6/2015 | Son | G06F 3/167 707/728 |

(Continued)

*Primary Examiner* — Boris Gorney
*Assistant Examiner* — Vaishali Shah
(74) *Attorney, Agent, or Firm* — McDermott, Will & Emery LLP

(57) ABSTRACT

Various aspects of the subject technology relate to systems, methods, and machine-readable media for language translation based on image search similarities. These aspects include an image retrieval system using a convolutional neural network that is trained to identify a correlation between an image and a language term, and using an image search engine to search against images corresponding to visual words that are responsive to a given search query in a given spoken language. These aspects include access to interaction probability data that identifies user interaction probabilities for the visual words to determine a correlation between the input language terms of the search query and the rate at which users interact with images of a corresponding visual word that is responsive to the search query. The system then provides a prioritized listing of images that is responsive to the given search query based on the identified user interaction probabilities.

20 Claims, 7 Drawing Sheets

| Search Term | Interaction Probability Data | | |
|---|---|---|---|
| | Meaning | Download Probability | Example Image |
| "PONT" (French) | A Span that Crosses a Divide | 0.80 | [606] |
| | A Patio | 0.15 | [607] |
| | A Turntable | 0.05 | [608] |

(56) References Cited

U.S. PATENT DOCUMENTS

| | | | |
|---|---|---|---|
| 2015/0169631 A1* | 6/2015 | Gu .................... | G06F 17/30244 |
| | | | 707/723 |
| 2017/0132526 A1* | 5/2017 | Cohen .................. | G06N 99/005 |
| 2018/0040020 A1* | 2/2018 | Kurian ............... | G06Q 30/0256 |

* cited by examiner

Interaction Probability Data

| Search Term | Meaning | Download Probability | Example Image |
|---|---|---|---|
| "PONT" (French) | A Span that Crosses a Divide | 0.80 | |
| | A Patio | 0.15 | |
| | A Turntable | 0.05 | |

LANGUAGE TRANSLATION BASED ON SEARCH RESULTS AND USER INTERACTION DATA

BACKGROUND

Field

The present disclosure generally relates to a computer-based neural network for image retrieval, and more particularly to language translation based on search results and user interaction data.

Description of the Related Art

Users commonly search for content, such as visual content items, and use the visual content items they find to produce a creative illustration. Such users can search for visual content items through a search interface for a media collection. When a user searches in a foreign language, a standard technique is to translate the query into English and then perform the search using that translation. Because a given word will often have many different meanings, and because a search query may be relatively short in its number of characters so as to lack any significant context to disambiguate, language-to-language translation often introduces irrelevant and/or unintended concepts in the English translation, thus causing search results to appear to be low-quality and irrelevant to some degree.

SUMMARY

The disclosed system provides for providing images mapped to spoken-language terms to a computer-operated neural network that is configured to analyze image pixel data for the images to identify features relevant in the images for a specific semantic meaning, identifying clusters of images for each semantic meaning, and providing image search results responsive to queries in different spoken languages for images. The disclosed system also provides, for each image search result responsive to a query in a given spoken language, a probability of user interaction for an image of the image search result. The probability of user interaction identifies the rate at which users interact with images (e.g., click on an image, save an image, download an image, etc.) of a corresponding semantic meaning that is responsive to a given query in the given spoken language. Image search results responsive to a specific query in a given spoken language are then prioritized according to the probability of user interaction corresponding to the given spoken language. In certain aspects, the computer-operated neural network is trained with a set of training images mapped to terms of a specific spoken language (e.g., English) so that the neural network can learn to identify features in images responsive to queries in different spoken languages.

According to one embodiment of the present disclosure, a computer-implemented method is provided for receiving user input identifying a search query associated with a given spoken language; identifying one or more visual words corresponding to the search query based on historical search queries in the given spoken language; obtaining images associated with the one or more visual words from a collection of images; and providing a listing of the images that are prioritized based on user interaction probabilities of the one or more visual words from the historical search queries.

According to one embodiment of the present disclosure, a system is provided including one or more processors and a computer-readable storage medium coupled to the one or more processors, the computer-readable storage medium including instructions that, when executed by the one or more processors, cause the one or more processors to receive a search query identifying one or more search terms in a given spoken language of a plurality of spoken languages for initiating an image search associated with a target spoken language of the plurality of spoken languages, the target spoken language being different than the given spoken language; identify user interaction probabilities for a plurality of images from a collection of images that are responsive to historical search queries in the plurality of spoken languages; identify a subset of the plurality of images corresponding to one or more visual words that are responsive to a subset of the historical search queries identifying the one or more search terms; determine that the search query corresponds to the one or more visual words based on the subset of the plurality of images being tagged with the one or more visual words; receive an identification of the subset of the images corresponding to the one or more visual words; identify the user interaction probabilities for the subset of the images from the user interaction probabilities for the plurality of images; and generate search results identifying a listing of the subset of the images that is prioritized according to the user interaction probabilities for the subset of the images.

According to one embodiment of the present disclosure, a non-transitory computer readable storage medium is provided including instructions that, when executed by a processor, cause the processor to receive a search query identifying one or more search terms in a given spoken language for initiating an image search associated with a target spoken language, the target spoken language being different than the given spoken language, the search query being received from a client application via a user interface of a client device; identify user interaction probabilities for a plurality of images from a collection of images that are responsive to historical search queries associated with the given spoken language; determine that the search query corresponds to one or more visual words based on a subset of the plurality of images corresponding to the one or more visual words being responsive to a subset of the historical search queries identifying the one or more search terms; receiving an identification of the subset of the images corresponding to the one or more visual words; identifying the user interaction probabilities for the subset of the images from the user interaction probabilities for the plurality of images; and generating search results identifying a listing of the subset of the images that is prioritized according to the user interaction probabilities for the subset of the images; and causing the search results to be displayed in an output section of the user interface.

According to one embodiment of the present disclosure, a system is provided for retrieving a set of images identified as responsive to an image search query from a user based on language translation using search results and user interaction data. The system includes means for receiving user input identifying a search query associated with a spoken language for initiating an image search; means for obtaining interaction probability data associated with the spoken language, the interaction probability data identifying an association between the search query and historical download rates of images corresponding to visual words; determining that one or more of the visual words correspond to the search query based on the association identified in the interaction probability data; determining a collection of images tagged with the one or more visual words; determining a listing of the images prioritized according to the historical download rates; and generating search results identifying the listing of the images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the images and detailed description are to be regarded as illustrative in nature and not as restrictive.

BRIEF DESCRIPTION OF THE IMAGES

The accompanying images, which are included to provide further understanding and are incorporated in and constitute a part of this specification, illustrate disclosed embodiments and together with the description serve to explain the principles of the disclosed embodiments. In the images:

DETAILED DESCRIPTION

Figure 1:
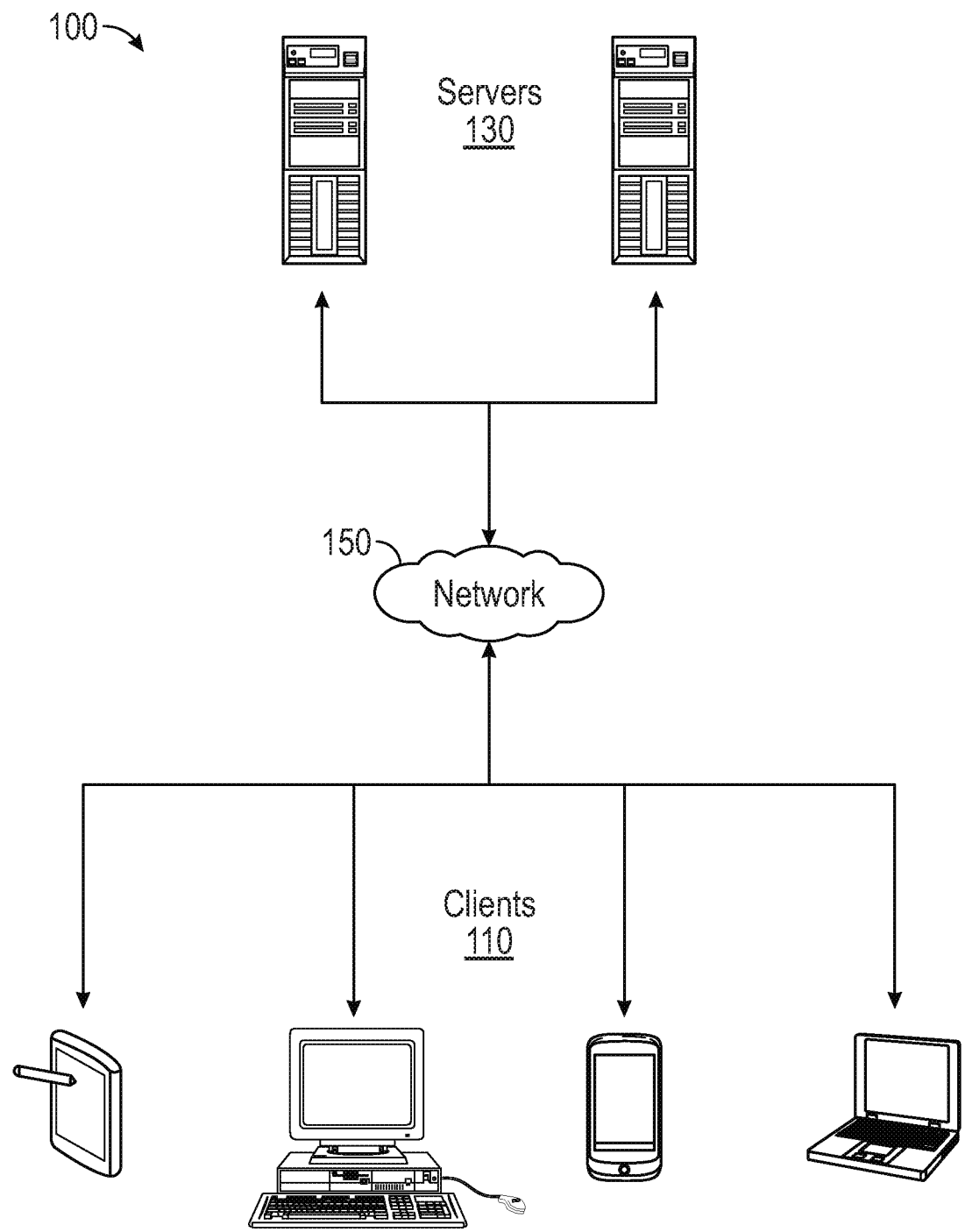
FIG. 1 illustrates an example architecture for a language translation based image search system suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "semantic concept" refers to the meaning used for understanding an object and/or environment of things. The term "visual word" as used herein refers to a particular meaning of a language word derived from its visual expression. The term "semantic concept" can be interchangeably used with the term "visual word" which captures the semantic space of a thing, and may be the target of an image search query.

There is a problem with current image search engines in that when a user searches in a given spoken language, a standard technique is to translate the query into English and then perform the search using that translation. Because a given word will often have many different meanings, and because a search query may be relatively short in the number of characters (e.g., one or two word phrase) as to lack any significant context to disambiguate, language-to-language translation often introduces irrelevant and/or unintended concepts in the English translation, thus causing search results to appear to be low-quality and irrelevant to some degree. For example, the term "bridge" can illustrate this problem. In the English language, the term "bridge" has multiple meanings including: (1) span that crosses a divide, (2) part of a musical instrument, (3) card game, or (4) replacement teeth. In the French language, the term "pont" has multiple meanings as well including: (1) span that crosses a divide, (2) patio, or (3) turntable. In practice, a user searching in the French language desiring visual content items relating to patios, searches for the term "pont," but commonly image search engines return images relating to replacement teeth instead.

The disclosed system addresses this problem specifically arising in the realm of computer technology by providing a solution also rooted in computer technology, namely, by the training of a computer-operated neural network, such as a convolutional neural network, to teach the neural network to identify features of images mapping to multiple language terms for identifying those images that are responsive to an input search query in a given spoken language. In certain aspects, the convolutional neural network is operated on a server and accesses large amounts of image data stored in memory of the server or stored elsewhere and accessible by the server in order to train the convolutional neural network. For example, a set of training images may be provided to the convolutional neural network in order to teach the convolutional neural network to identify features of a training image for a term in a specific spoken language.

Once the convolutional neural network has been trained to predict which features of the training images identify a specific language term, for each language term, the trained neural network generates vectors for each of the corresponding training images for the given language term. The generated vectors are clustered such that each one of the resulting cluster centroids represents a visual word. Within the images of a corresponding language term, there is a cluster of images for each semantic meaning. In this respect, the disclosed system utilizes computer-vision techniques to identify a set of visual words that captures the semantic space of all things which could be the target of a query, and then maps those visual words to spoken language words and phrases using a large volume of historical customer search queries and subsequent interactions with the images. The convolutional neural network can mark (or tag) images with the corresponding language such that the disclosed system can readily identify those images that correspond to a given search term label in a given spoken language.

The disclosed system can accept a search query identifying a search term in a given spoken language to search against images corresponding to visual words that are historically interacted by users searching for the same search term in other spoken languages, and provide images responsive to the respective foreign spoken language. In this respect, the disclosed system can translate spoken language words and phrases that may be used as search queries.

The proposed solution further provides improvements to the functioning of the computer itself because it saves data storage space and reduces network usage. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlated to a language term corresponding to those features without this information.

Although many examples provided herein describe a user's search inputs being identifiable, or download history for images by given spoken languages being stored, each user must grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

FIG. 1 illustrates an example architecture 100 for providing a set of images identified as responsive to an image search query in a spoken language from a user based on a mapping between the image search query and visual words corresponding to the set of images. The architecture 100 includes servers 130 and clients 110 connected over a network 150.

One of the many servers 130 is configured to host a computer-operated neural network. The neural network, which can be a convolutional neural network, is trained to identify features of images corresponding to one or more visual words. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating an association between the features and corresponding semantic concept, once identified, are likely to indicate that the image corresponds to a particular language term. The servers 130 can return images tagged with the particular visual word to the clients 110 in response to a search query identifying a given language term in a spoken language that corresponds to the particular visual word. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
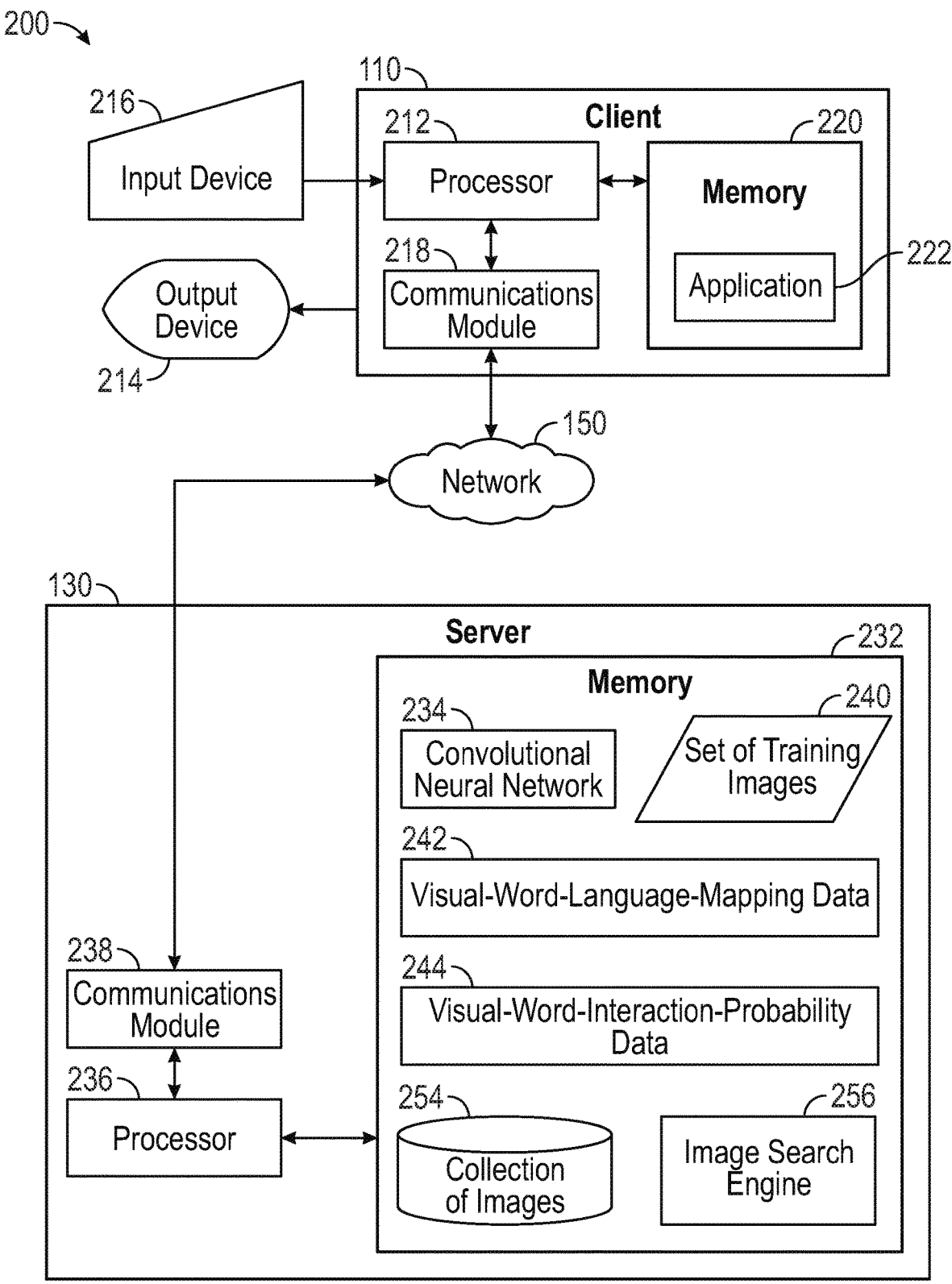
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a convolutional neural network 234. As discussed herein, a convolutional neural network 234 is a type of feed-forward artificial neural network where individual neurons are tiled in such a way that the individual neurons respond to overlapping regions in a visual field. The architecture of the convolutional neural network 234 may be in the style of existing well-known image classification architectures such as AlexNet, GoogLeNet, or Visual Geometry Group models. In certain aspects, the convolutional neural network 234 consists of a stack of convolutional layers followed by several fully connected layers. The convolutional neural network 234 can include a loss layer (e.g., softmax or hinge loss layer) to back propagate errors so that the convolutional neural network 234 learns and adjusts its weights to better fit provided image data.

The memory 232 also includes a collection of images 254 and an image search engine 256 for searching the collection of images 254. Also included in the memory 232 of the server 130 is a set of training images 240. The set of training images 240 can be, for example, a dataset of image content items consisting of a predetermined number of classes (e.g., about 10,000) with a predetermined number of image content items per class. The classes can correspond to visual words representing the semantic concepts, for example, dog (canine), boat (water vessel), bridge (span that crosses a divide), etc. The set of training images 240 may include image vector information and image cluster information, in which the image vector information identifies training vectors representing a large sample of training images and the image cluster information identifies clusters representing respective visual words. In this respect, the vectors corresponding to a semantic concept are clustered into one cluster representing that semantic concept.

The collection of images 254 can be, for example, a dataset of images consisting of a predetermined number of classes (e.g., 10,000) with image vector information and image cluster information. The image vector information identifies vectors representing a large sample of images (e.g., about 50 million) and the image cluster information identifies the vectors in one or more clusters representing respective visual words such that each of the cluster of images represents a visual word or semantic concept.

Although the set of training images 240 is illustrated as being separate from the collection of images 254, in certain aspects the set of training images 240 is a subset of the collection of images 254. Furthermore, although the collection of images 254 and the image search engine 256 are illustrated as being in the same memory 232 of a server 130 as the convolutional neural network 234, in certain aspects the collection of images 254 and the image search engine 256 can be hosted in a memory of a different server but accessible by the server 130 illustrated in FIG. 2.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 234 that is configured to analyze image pixel data for each of the plurality of training images to identify features, in each of the plurality of training images, corresponding to a particular semantic concept and receive, from the convolutional neural network 234 and for each of the plurality of training images, an identification of one or more language terms corresponding to the image processed by the convolutional neural network 234.

Once the convolutional neural network has been trained to predict which features of the set of training images 240 identify a specific language term, for each language term, the trained neural network generates vectors for each of the corresponding training images for the given language term. The generated vectors are clustered such that each one of the resulting cluster centroids represents a visual word. Within the images of a corresponding language term, there is a cluster of images for each semantic meaning. The number of visual words may be in proportion to the number of clusters, and may scale arbitrarily up to the number of semantic meanings that a given language term may have.

The memory 232 includes visual-word-language-mapping data 242. In certain aspects, the processor 236 is configured to determine the visual-word-language-mapping data 242 by associating each of the visual words to images. For example, the processor 236 may associate the visual word to the image by determining a centroid vector of the corresponding language term that is closest to the given vector of the image. In some aspects, the processor 236, using the image search engine 256, obtains image search results responsive to historical search queries in a given spoken language (e.g., English), and identifies the closest centroids to the image vectors of such image search results. The processor 236 may obtain, via the image search engine 256, subsequent user-image interaction to formulate the association between the language word and the visual word. In some aspects, the visual-word-language-mapping data 242 includes additional mappings between a cluster of images and a corresponding visual word such that the images are indexed by a corresponding cluster identifier.

The memory 232 also includes visual-word-interaction-probability data 244. In certain aspects, the processor 236 is configured to determine the visual-word-interaction-probability data 244 by obtaining user interaction data identifying interactions with images from image search results that are responsive to search queries in one or more spoken languages. For example, the processor 236 may determine that a user interacted with an image, such as, by clicking on the image, saving the image for subsequent access, or downloaded the image to a client (e.g., client 110), or the like. The processor 236 may determine a proportion at which the image is interacted by the user with respect to a specific query in a given spoken language relative to other images of the same image search result. For example, the processor 236 may identify that the image is responsive to the specific query in a greater proportion to the other images based on the image having a greater rate of interaction by users for that specific query.

In certain aspects, the processor 236 of the server 130 is configured to receive a user input from a user. The user input identifies a search query associated with a given spoken language. For example, the search query may be entered as an English term or a French term. In this respect, the search query in the given spoken language is provisioned to the image search engine 256 for initiating the image search through the collection of images 254. The user input is received, for example, by the user accessing the image search engine 256 over the network 150 using an application 222 in memory 220 on a client 110 of the user, and the user submitting the user input using an input device 216 of the client 110. For example, the user may use the input device 216 to enter the text-based search term or phrase in the given spoken language. In response to the user input for the search query, a processor of the client 110 is configured to transmit the search query over the network 150 using the communications module 218 of the client 110 to the communications module 238 of the server 130. As described herein, the number of spoken languages used is not limited to English and/or French, and the number of spoken languages can vary to include other spoken languages depending on implementation.

The processor 236 of the server 130, upon receiving the search query for the image search engine 256, is configured to submit the search request for the search query to the image search engine 256. The processor 236 then receives an identification of a plurality of images, which corresponds to one or more visual words that are mapped to one or more search terms of the search query in the given spoken language (e.g., using the visual-word-language-mapping data 242), from the collection of images 254 that are responsive to the search query, and is configured to provide a listing of the plurality of images with a ranking (or prioritization) according to user interaction probabilities of the corresponding visual words (e.g., using the visual-word-interaction-probability data 244). The listing of the plurality of images that is prioritized (or ranked) according to the user interaction probabilities is provided, for example, by the processor 236 of the server 130 being configured to submit the plurality of images to the convolutional neural network 234 prior to the search query being received, and the convolutional neural network 234 identifying the language terms associated with each of the plurality of images. The processor 236 may then provide the listing to the application 222 on the client 110 over the network 150 for display by an output device 214 of the client 110.

A user of the client 110 may use the input device 216 to submit a search term or phrase in the given spoken language via a user interface of the application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part).

In certain aspects, the processor 236 is configured to determine a collection of images based on mapping information identified in the visual-word-language-mapping data 242. The processor 236 may be configured to submit the visual-word-language-mapping data 242 to the image search engine 256 to determine images that correspond to visual words mapped to counterpart language terms in the given spoken language. In this respect, the processor 236 may call the image search engine 256 to search for images corresponding to one or more visual words that are responsive to the search query. In some aspects, a visual word corresponds to a subset of images that are downloaded in greater proportion than other visual words mapped to the same search query.

In some aspects, the processor 236, using the convolutional neural network 234 and the visual-word-language-mapping data 242, can tag each of the plurality of images with metadata identifying one or more keywords in one or more spoken languages that correspond closest to one or more visual words. The tagging can serve as an indication of the mapping between a language term and a corresponding visual word.

In some aspects, the processor 236 of the server 130 is configured to generate search results associated with the image search. For example, the processor 236 may generate the search results by obtaining images of the collection of images which correspond to visual words that historically have been downloaded at a higher rate than other visual words, in response to the search query for a given spoken language. The processor 236 may prioritize the search results based on the user interaction probabilities for the visual words. In some examples, the search results may include a listing of images corresponding to a first visual word in greater proportion than images corresponding to a second visual word based on their respective user interaction probabilities.

In one or more implementations, the processor 236 is configured to process search data of users in a first given spoken language. For example, the processor 236 may monitor users that search for a particular word in French, and determine that those users interact with images corresponding to respective visual words at respective interaction rates (e.g., click-on rates, download rates, saving rates, etc.). In these aspects, a download rate is a ratio of a number of download instances for the corresponding visual word to a total number of download instances. In this respect, the processor 236 can identify a first image (e.g., "bridge" in English) corresponding to a first visual word (e.g., a span that crosses a divide) being download in response to the search query (e.g., "pont" in French) at a first download rate (e.g., about 80%). In turn, the processor 236 can identify a second image (e.g., outdoor patio set) corresponding to a second visual word (e.g., a patio) being download in response to the search query (e.g., "pont" in French) at a second download rate (e.g., about 15%). The processor 236 can then map one or more search terms of the search query (e.g., the term "pont") to the first visual word and the second visual word as mapping information (e.g., visual-word-language-mapping data 242) associated with the first given spoken language (e.g., "French"). The mapping information may be associated with interaction probability information (e.g., visual-word-interaction-probability data 244) that includes indications of the first download rate and the second download rate respectively associated with the first visual word and the second visual word. In this embodiment, the mapping information and the interaction probability information is determined and/or collected prior to the user input being received by the server 130. In some aspects, the processor 236 can detect interactions with the first image (e.g., image) and the second image (e.g., patio set) that are subsequent to the processing of the search data. The processor 236 can then determine that the first image and the second image have been downloaded at a rate that is different than the first download rate and the second download rate to justify modifying the interaction probability information to include modified download rates for the first image and the second image based on the detected subsequent interactions. In this respect, the visual-word-interaction-probability data 244 can be updated in the event that subsequent interactions with monitored images are detected.

Figure 3:
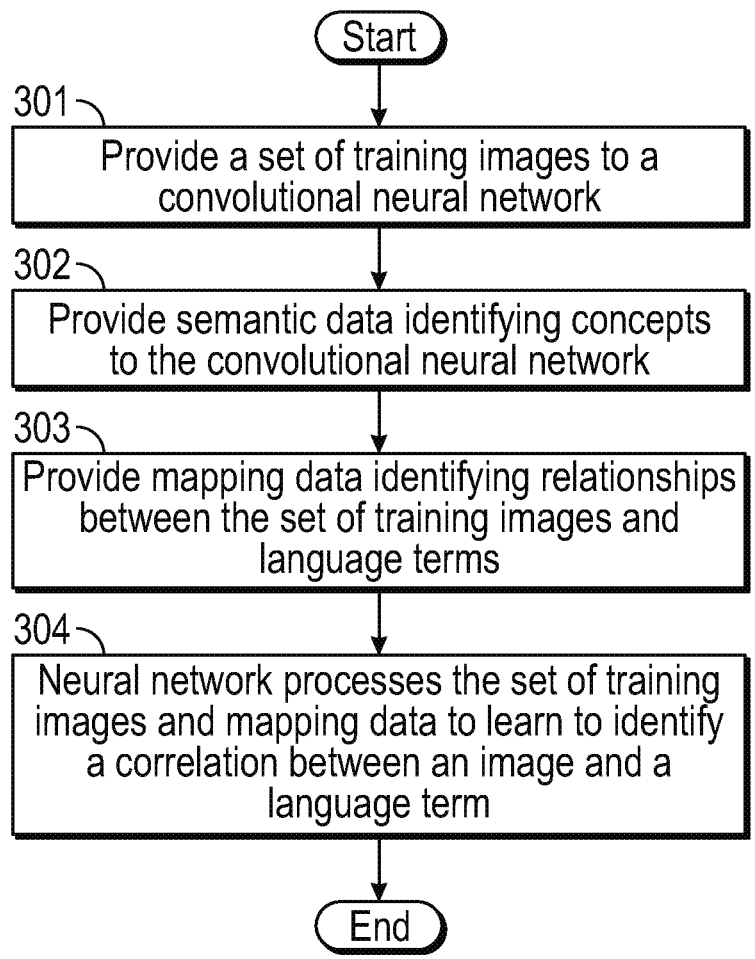
FIG. 3 illustrates an example process for training a convolutional neural network to analyze image pixel data to identify features in example images using the example server of FIG. 2.

FIG. 3 illustrates an example process 300 for training a convolutional neural network 234 to analyze image pixel data to identify features in example images using the example server 130 of FIG. 2. While FIG. 3 is described with reference to FIG. 2, it should be noted that the process steps of FIG. 3 may be performed by other systems.

The process 300 begins by proceeding from beginning step to step 301 when a set of training images 240 is fed through a convolutional neural network 234. For example, the convolutional neural network 234 can consist of a stack of eight layers with weights, the first five layers being convolutional layers and the remaining three layers being fully-connected layers. The set of training images 240 can be fixed-size 256×256 pixel Black-White image data or Red-Green-Blue (RGB) image data.

Subsequently, in step 302, semantic data identifying concepts is provided to the convolutional neural network 234. The semantic data may include a listing of language terms and/or semantic concepts which correspond to respective meanings for an object or thing. The processor 236 may be configured to submit a portion of the semantic data to the convolutional neural network 234 when a corresponding training image or set of training images is fed to the convolutional neural network 234 for correlating the fed training images to the semantic concept identified in the portion of the semantic data. In one or more aspects, the semantic data may be indexed based on the training image and/or set of training images fed to the convolutional neural network 234 to identify the semantic concept corresponding to the index.

In step 303, mapping data identifying relationships between the set of training images 240 and language terms in a given spoken language (e.g., English) can be provided to the convolutional neural network 234. The mapping data, for example, may include predetermined mapping information which identifies a mapping between a first English language term and one or more images identifying content that resembles a semantic concept associated with the first English language term.

Next, in step 304, the convolutional neural network 234 processes the set of training images 240 in order to learn to identify a correlation between an image and a language term by analyzing pixel data of the image. Training with the set of training images 240 may be regularized by weight decay and dropout regularization for the first two fully-connected layers with a dropout ratio set to 0.5, and the learning rate may initially be set to $10^{-2}$ and then decreased by a factor of 10 when validation set accuracy stops improving for the convolutional neural network 234.

In other aspects, the features extracted using the model generated by the convolutional neural network 234 as trained in step 304 is implemented with three fully connected layers of the convolutional neural network 234. The extracted features may be then fed into a multinomial logistic regression to map them to their respective semantic concept (e.g., from the semantic data and mapping data). As a result, after step 304, the convolutional neural network 234 provides a trained model specialized to understand and identify language terms corresponding to images that would be responsive to image search queries. The process 300 ends by terminating at the ending step.

Figure 4:
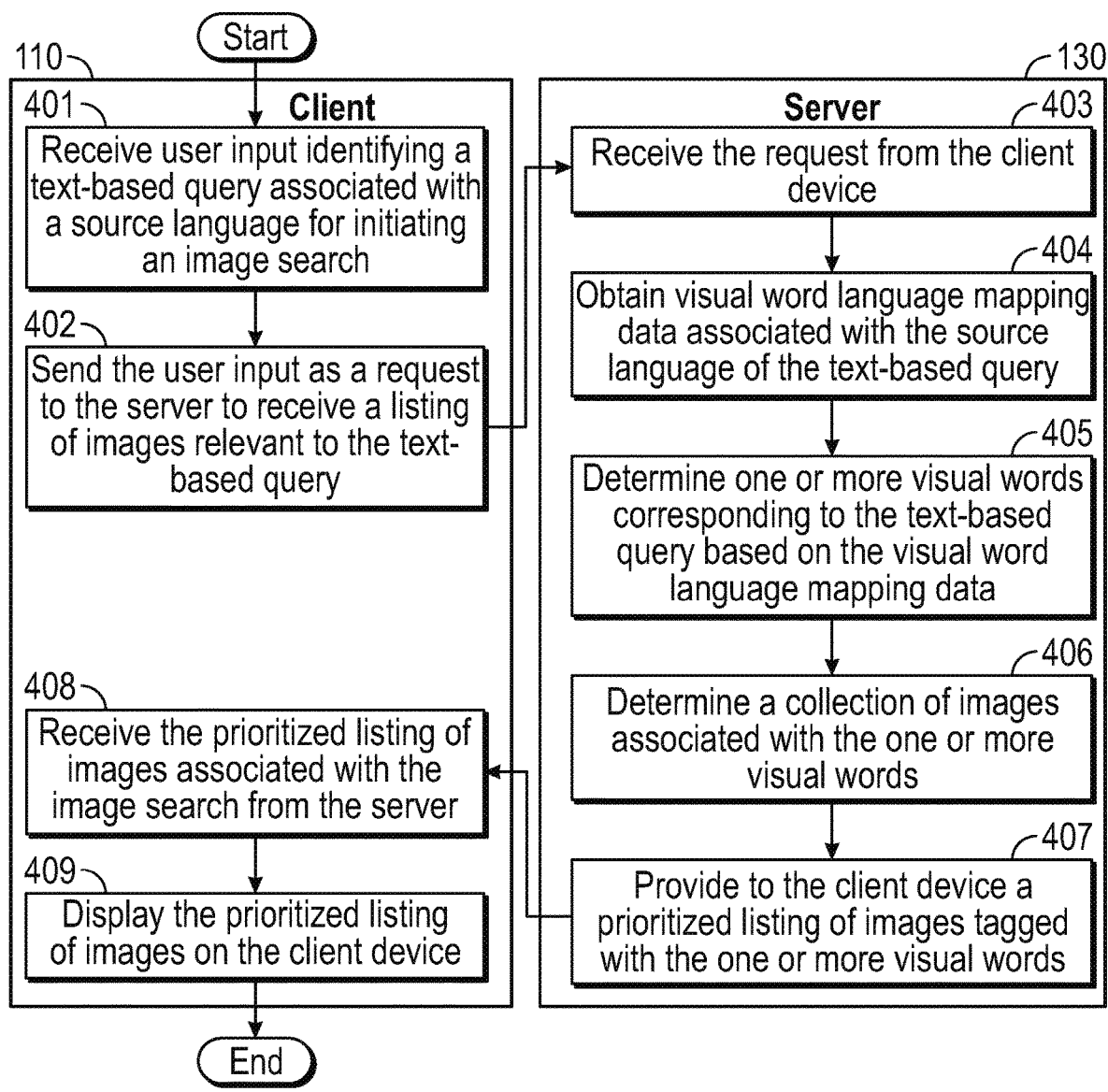
FIG. 4 illustrates an example process for language translation based image search using the example client and server of FIG. 2.

FIG. 4 is an example process 400 for language translation based image search using the example client and server of FIG. 2. The process 400 begins in step 401 when a user, for example, loads an application 222 on a client 110 and the client 110 receives an input from the user using the input device 216 for a search query for a collection of images 254.

The input identifies one or more search terms in a given spoken language of a plurality of spoken languages for initiating an image search associated with a target spoken language of the plurality of spoken languages. In this respect, an English-based image search engine may identify images that are responsive to a search query in a given spoken language (e.g., French, German, Spanish, etc.) by identifying corresponding visual words mapped to counterpart language terms in the given spoken language. The user can utilize the input device 216 to submit one or more search terms in the given spoken language as part of the text-based search query via a user interface of the application 222.

Next, in step 402, the application 222 on the client 110 sends the user input as a request to the server 130 in order to receive a listing of images responsive to the text-based search query. Turning to the server 130, in step 403, the server 130 receives the user input for the search query for a collection of images from the client 110.

Subsequently, in step 404, the server 130 obtains the visual-word-interaction-probability data 244 associated with the given spoken language of the text-based search query. In some aspects, the server 130 obtains the visual-word-interaction-probability data 244 in response to receiving the search query from the client 110. The processor 236 of the server 130 can process the visual-word-interaction-probability data 244 to identify historical search queries in the given spoken language and subsequent user-image interactions associated with the respective historical search query. In step 405, the processor 236 of the server 130 can parse the historical search queries to identify one or more visual words corresponding to the search query. In some aspects, each entry of the historical search queries may include a mapping between the search query and a visual word. The visual-word-interaction-probability data 244 may identify a user interaction probability for the visual word which indicates a download rate at which a user downloads an image that is responsive to the search query in the given spoken language. In some aspects, the visual-word-interaction-probability data 244 includes a distribution of the user interaction probabilities for the one or more visual words corresponding to the images that are responsive to the search query in the given spoken language. In other aspects, the visual-word-interaction-probability data 244 includes other distributions of the user interaction probabilities for the one or more visual words that correspond to images that are responsive to the search query in other spoken languages. In these aspects, the distributions may be indexed by their respective spoken language or by chronological order.

Next, in step 406, an identification of a plurality of images from the collection of images 254 that are responsive to the search query is received, particularly images corresponding to the one or more visual words that are mapped to search terms of the search query in the given spoken language. In this respect, the images represent a subset of the overall number of images in the collection of images 254, thereby alleviating the image search burden by reducing the volume of images to search against.

Subsequently, in step 407 the server 130 provides the client 110 with a listing of the plurality of images that is prioritized according to the user interaction probabilities associated with the one or more visual words. Turning to the client 110, in step 408, the client 110 receives the listing of the plurality of images associated with the image search from the server 130. Next, in step 409, the prioritized listing of the plurality of images is provided for display via the application 222 of the client 110.

In some implementations, the processor 236 may be configured to obtain historical search queries in a target spoken language for performing a language-to-language translation. For example, a search query in the Spanish language can be translated to the English language using one or more visual words (and their associated English language words) that corresponds to the most downloaded image in response to the search query in Spanish. Language terms or phrases in the English language that correspond closest to the visual word are then used to represent the translated version of the original search query in Spanish. In turn, the processor 236 can provide a listing of the language terms or phrases in the target spoken language (e.g., English) in response to the search query using the given spoken language (e.g., Spanish).

Figure 5:
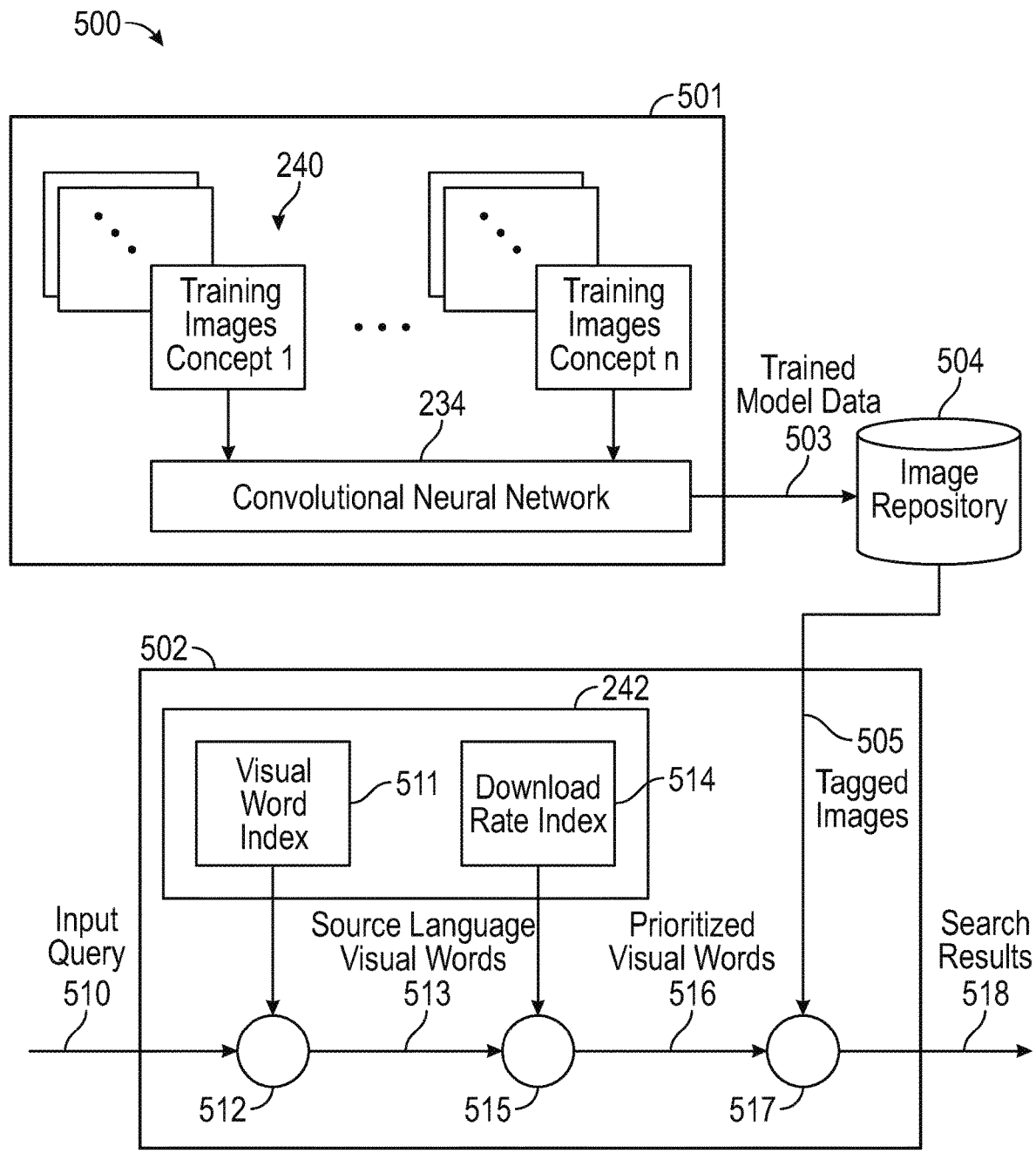
FIG. 5 illustrates a schematic diagram of an example architecture suitable for practicing the example process of FIG. 4.

FIG. 5 illustrates a schematic diagram of an example architecture 500 suitable for practicing the example process of FIG. 4. The architecture 500 illustrates the process of FIG. 4 as a two-part process, where a first part 501 relates to the training process of the convolutional neural network 234, and a second part 502 relates to the processing of the user input for the forward image search. In this respect, the architecture 500 provides for an input search query in a given spoken language to search for images corresponding to one or more visual words that map, or at least in part, to the search query. In one or more embodiments, the operations relating to the first part 501 are performed independent of the operations relating to the second part 502 such that operations in the first part 501 may be performed offline in advance.

In the first part 501, the processor 236 of the server 130 may submit a plurality of training images (e.g., 240) to the convolutional neural network 234 that is configured to analyze pixel data for each of the plurality of training images to identify features in each of the plurality of training images. The processor 236 also may submit training semantic data and/or training mapping data to the convolutional neural network 234 as part of the training process. As discussed in FIG. 3, the training semantic data may be used to identify visual words to the convolutional neural network 234 and the training mapping data may be used to identify relationships between the training images and the visual words. The convolutional neural network 124 processes the different types of training data to learn to identify features in the images that correspond to at least one of the visual words. In turn, the convolutional neural network 234 outputs trained model data 503 based on the training process. The trained model data 503 may be stored separately from image repository 504 or as part of the image repository 504.

In the second part 502, the processor 236 of the server 130 is configured to receive an input query 510 from a user. The input query 510 identifies one or more search terms in a given spoken language for initiating an image search associated with a target spoken language. Upon receiving the input query 510, the processor 236 submits the input query 510. At element 512, the input query 510 is processed with at least a portion of the interaction probability data 242 by accepting the visual word index 511 as input. In some aspects, the visual word index 511 provides an indication of the visual word that is mapped to one or more language terms of the search query. The output of the element 512 provides given spoken language visual words for processing with the download rate index 514 at element 515. The download rate index 514 provides download rates for each of the given spoken language visual words. The output of the element 515 provides prioritized visual words 516 which are ranked according to the respective user interaction probabilities using historical customer search queries and any subsequent interactions with images from the image repository 504 (or from the collection of images 254).

The processor 236, upon receiving the prioritized visual words 516, is configured to submit a search request to the image search engine 256. The processor 236 then receives an identification of a plurality of images, corresponding to visual words that are mapped to language terms of the search request, from the collection of images 254 that are responsive to the search query. The collection of images 254 may be stored in an image repository 506 accessible to the server 130. In one aspect, the plurality of images are tagged (e.g., 505) with the corresponding visual words to denote an association between the images and language terms/phrases of the given spoken language. The processor 236 provides search results 518 with a ranking according to user interaction probabilities of the visual words from the download rate index 514. The processor 236 may provide the ranked search results 518 to the application 222 on the client 110 over the network 150 for display by an output device 214 of the client 110.

Figures 6A, 6B:
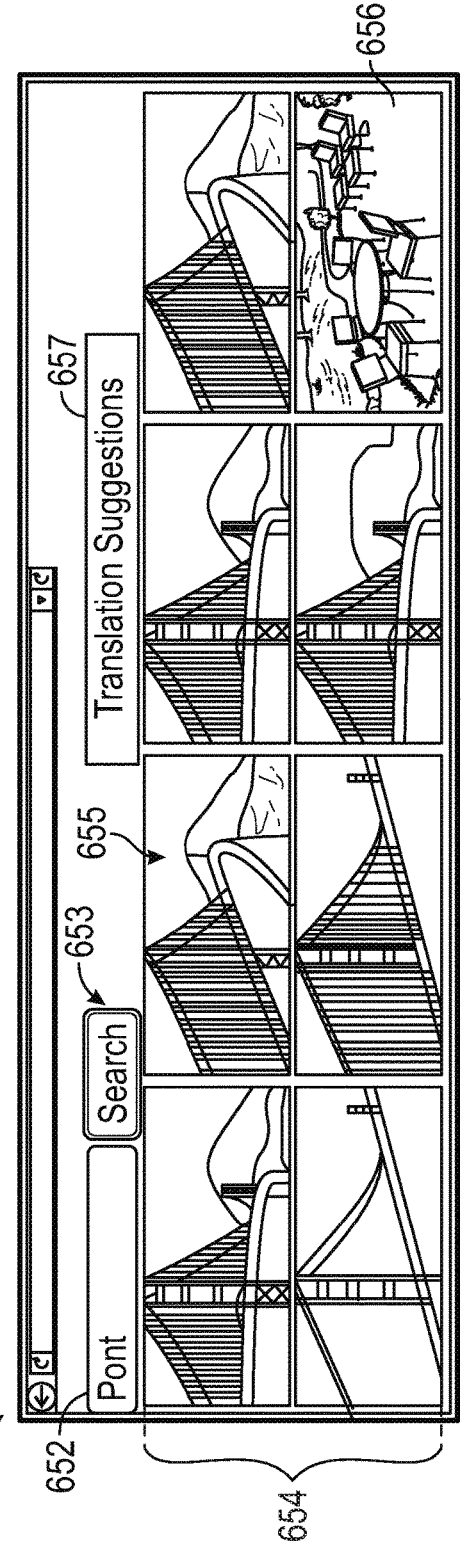
FIG. 6A illustrates an example of interaction probability data associated with a search query in a spoken language according to certain aspects of the disclosure.
FIG. 6B illustrates a user interface for language translation based image search using the interaction probability data of FIG. 6A.

FIG. 6A illustrates an example of interaction probability data 600 associated with a search query in a given spoken language according to certain aspects of the disclosure. The interaction probability data 600 may be a data structure that includes search term information 602, definition information 603, and user interaction probability information 604. In one or more implementations, each of the definition information 603 may be associated with an example image 605 depicting the subject matter in that semantic space.

The interaction probability data 600 identifies user interaction probabilities of images corresponding to respective visual words. In this embodiment, the interaction probability data 600 indicates that when users search for the term "pont" in the French language, the users have historically downloaded images corresponding to the visual word (e.g., 606) representing a "span that crosses a divide" about 80% of the time, or at a download rate of about 0.80. On the other hand, the users have historically downloaded images corresponding to the visual word (e.g., 607) representing a "patio" about 15% of the time, or at a download rate of about 0.15. The remaining visual word (e.g., 608) representing a "turntable" is seen to have been historically downloaded about 5% of the time, or at a download rate of about 0.05. The user interaction probabilities and download rates described herein are only examples, and can vary depending on implementation. In this respect, the interaction probability data 600 can be used to prioritize a listing of images that are responsive to the search query. In some aspects, the proportion of images corresponding to each visual word can vary according to the user interaction probabilities. For example, images that correspond to the visual word 606 that represents "a span that crosses a divide" would make up about 80% of the images being provided for display within the listing, whereas images corresponding to the visual word 607 that represents "a patio" would make up about 15% or the remaining images within the listing.

The interaction probability data 600 may include data for multiple search terms in the given spoken language, as well as other search terms in other given spoken languages. In this respect, the interaction probability data 600 may be indexed by the given spoken language such that search terms in the given spoken language are stored together in the data structure but indexed separately from the search terms in the other given spoken languages. In some aspects, the interaction probability data 600 is a global file such that search terms for all given spoken languages are indexed according to a predetermined prioritization scheme (e.g., alphabetically, numerically, user-specified, etc.).

FIG. 6B illustrates a user interface for language translation based image search using the interaction probability data of FIG. 6A. Specifically, FIG. 6B provides an example user interface for initiating a language translation based image search via an application 222 responsive to a text-based image search query 652 in a given spoken language. FIG. 6B also provides an example illustration of a prioritization for a listing of images 654 displayed in the user interface responsive to the image search query 652.

In FIG. 6B, the user interface of the application 222 includes an input section for receiving the image search query 652 and an output section for displaying a listing of images 654. The input section includes a search control 653 for initiating the image search using the received image search query 652. Search results responsive to the image search query 652 are provided for display via the output section. In this embodiment, the search results include images 655 corresponding to the visual word 606 (e.g., a bridge or a span that crosses a divide) and an image 656 corresponding to the visual word 607 (e.g., a patio). As shown in FIG. 6B, the images corresponding to the visual word 606 are provided for display in greater proportion to the images corresponding to the visual word 607 based on the user interaction probability associated with each visual word (see FIG. 6A).

In some embodiments, the user interface includes translation suggestions 657 for suggesting one or more possible language translations of the image search query 652 such as identifying a translation from the given spoken language to the target spoken language. In this example, the term "pont" in the French language may be translated to the English term "bridge" based on target language terms (e.g., English words or phrases) corresponding most strongly (or most closely) to the same visual words mapped to the given spoken language (e.g., French). In this respect, the visual word 606 maps most strongly to the terms "bridge" and "pont" since both have historically caused the download of images corresponding to the visual word 606 at the highest proportion compared to the other visual words. This is indicative of the terms "bridge" and "pont" representing the meaning of "a span that crosses a divide" in their respective spoken language, thereby serving as an indication of a language-to-language translation based on search results and user interaction data. In some aspects, the translation suggestions 657 may include a listing prioritized according to how closely the target language term corresponds to the visual word. For example, the listing may be composed of a primary translation suggestion and one or more secondary translation suggestions.

Figure 7:
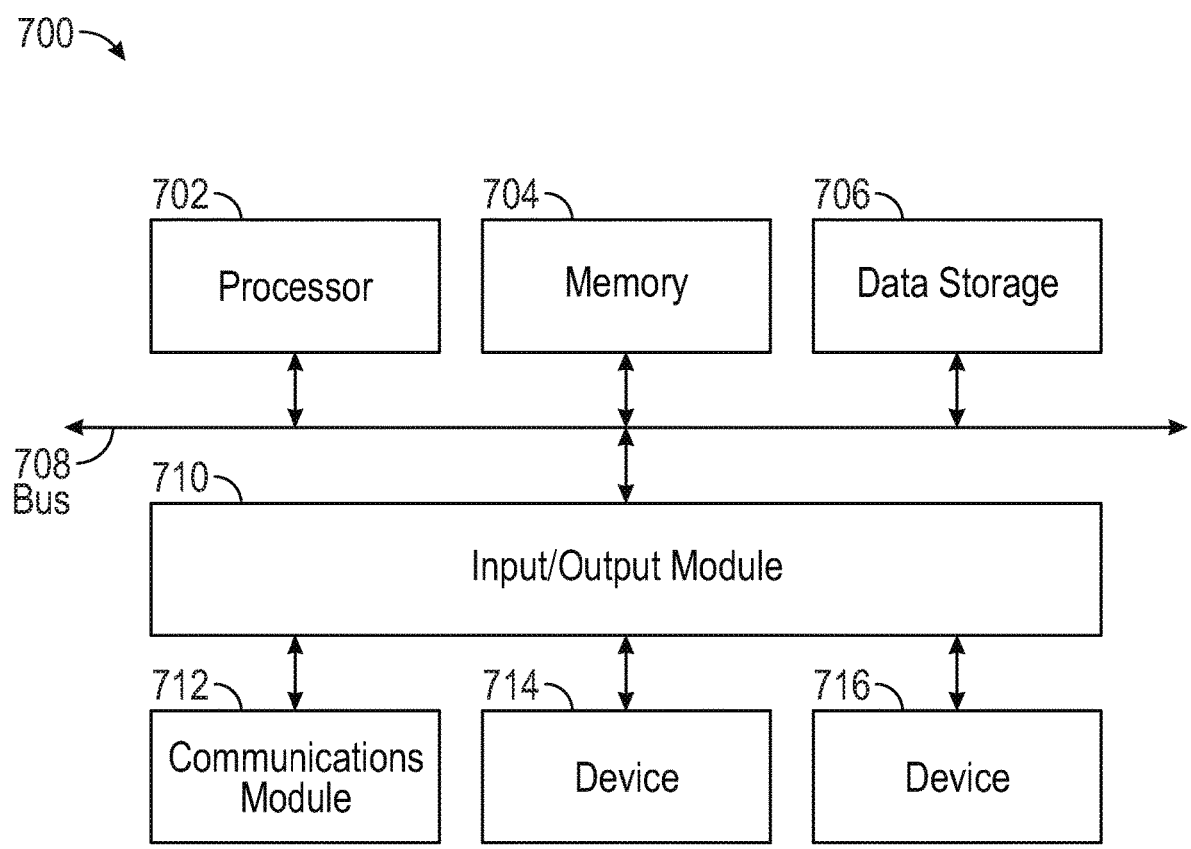
FIG. 7 is a block diagram illustrating an example computer system with which the client and server of FIG. 2 can be implemented.

FIG. 7 is a block diagram illustrating an exemplary computer system 700 with which the client 110 and server 130 of FIG. 1 can be implemented. In certain aspects, the computer system 700 may be implemented using hardware or a combination of software and hardware, either in a dedicated server, or integrated into another entity, or distributed across multiple entities.

Computer system 700 (e.g., client 110 and server 130) includes a bus 708 or other communication mechanism for communicating information, and a processor 702 (e.g., processor 212 and 236) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 (e.g., communications modules 218 and 238) include networking interface cards, such as Ethernet cards and modems. In certain aspects, the input/output module 710 is configured to connect to a plurality of devices, such as an input device 714 (e.g., input device 216) and/or an output device 716 (e.g., output device 214). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as a LCD (liquid crystal display) monitor, for displaying information to the user.

According to one aspect of the present disclosure, the client 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the images in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:

receiving a user input identifying a search query associated with a language;

identifying one or more visual words corresponding to the search query based on a historical search query in the language, wherein the one or more visual words corresponds to one or more semantic concepts of the search query;

obtaining images associated with the one or more visual words from a collection of images;

providing a listing of the images that are prioritized, prior to receiving the user input, based on a user interaction probability of the one or more visual words from the historical search query, the user interaction probability indicative of an interaction distribution of images corresponding to the one or more visual words, the interaction distribution of images identifying respective rates at which users of the language interact with the images corresponding to each of the one or more visual words, wherein the listing of the images comprises a first quantity of images based on the user interaction probability associated with a first visual word of the one or more visual words and a second quantity of images based on the user interaction probability associated with a second visual word of the one or more visual words, wherein the first quantity of images and the second quantity of images are provided in proportion to the user interaction probability;

detecting subsequent user interactions with the images associated with the one or more visual words; and updating the user interaction probability of the images corresponding to each of the one or more visual words with the subsequent user interactions that are detected, wherein the search query comprises a language term and identifying the one or more visual words comprises selecting a centroid in a cluster of vectors, each vector associated with an image from the collection of images that includes features indicative of the language term.

2. The computer-implemented method of claim 1, wherein the identifying the one or more visual words comprises:
   obtaining, in response to the user input, the historical search query in the language;
   parsing the historical search query to identify mapping information, the mapping information indicating an association between the one or more visual words and the search query; and
   identifying the user interaction probability associated with the one or more visual words from the mapping information.

3. The computer-implemented method of claim 1, wherein the interaction distribution of images identifies respective download rates for users of the language corresponding to each of the one or more visual words.

4. The computer-implemented method of claim 1, further comprising:
   obtaining the historical search queries in a target language, the historical search queries including interaction data that identifies the subsequent user interactions with one or more image search results responsive to at least one of the historical search queries;
   identifying the one or more visual words in the historical search queries of the target language;
   determining one or more language terms in the target language that correspond to the one or more visual words based on the historical search queries and the subsequent user interactions; and
   providing a listing of the one or more language terms in the target language in response to the search query.

5. The computer-implemented method of claim 4, further comprising:
   providing a plurality of translation suggestions identifying a translation from the language to the target language, the plurality of translation suggestions indicating language words in the target language that are respectively associated with one of the one or more visual words.

6. The computer-implemented method of claim 5, wherein the plurality of translation suggestions include a listing of the language words that are prioritized according to how closely each of the language words corresponds to the one of the one or more visual words.

7. The computer-implemented method of claim 1, further comprising:
   processing search data of users in a first language;
   identifying a first image corresponding to the first visual word being download in response to the search query at a first download rate;
   identifying a second image corresponding to the second visual word being download in response to the search query at a second download rate; and
   mapping one or more search terms of the search query to the first visual word and the second visual word into mapping information associated with the first language, including indications of the first download rate and the second download rate respectively with the first visual word and the second visual word, wherein a mapping occurs prior to the receiving the user input.

8. The computer-implemented method of claim 7, further comprising:
   detecting interactions with the first image and the second image, subsequent to a processing of a search data;
   determining that the first image and the second image are download at a rate different than the first download rate and the second download rate; and
   modifying the mapping information to include modified download rates for the first image and the second image based on the interactions.

9. The computer-implemented method of claim 1, further comprising:
   providing a set of training images to a convolutional neural network;
   providing semantic data identifying the one or more semantic concepts to the convolutional neural network;
   providing mapping data identifying relationships between the set of training images and the one or more semantic concepts, wherein the convolutional neural network processes the set of training images and the mapping data to learn to identify features relating to at least one of the one or more semantic concepts;
   submitting a plurality of images from a collection of images to the convolutional neural network that is configured to analyze image pixel data for each of the plurality of images to identify features that relate to at least one of the one or more semantic concepts;
   generating multiple vectors for each of the plurality of images using the features; and
   forming a cluster with the vectors to find the visual word.

10. The computer-implemented method of claim 9, further comprising:
    tagging each of the plurality of images with metadata identifying one or more keywords in one or more spoken languages.

11. A system comprising:
    one or more processors;
    a computer-readable storage medium coupled to the one or more processors, the computer-readable storage medium including instructions that, when executed by the one or more processors, cause the one or more processors to:
    receive a search query identifying one or more search terms in a language selected from multiple languages, for initiating an image search associated with a target language, the target language being different than the language;
    identify, prior to receiving the search query, a user interaction probability for a plurality of images from a collection of images that are responsive to historical search queries in the language, the user interaction probability indicative of an interaction distribution of images corresponding to a one or more visual words, the interaction distribution of images identifying respective rates at which users of the language interact with the images corresponding to each of the one or more visual words, wherein the one or more visual words corresponds to one or more semantic concepts of the search query;
    identify a subset of the plurality of images corresponding to the one or more visual words that are responsive to a historical search query identifying the one or more search terms;
    determine that the search query corresponds to the one or more visual words based on the subset of the plurality of images being tagged with the one or more visual words;

receive an identification of the subset of the images corresponding to the one or more visual words;
identify the user interaction probability for the subset of the images from the user interaction probability for the plurality of images;
generate search results identifying a listing of the subset of the images that is prioritized according to the user interaction probability for the subset of the images, wherein the listing of the subset of the images comprises a first quantity of images based on the user interaction probability associated with a first visual word of the one or more visual words and a second quantity of images based on the user interaction probability associated with a second visual word of the one or more visual words, wherein the first quantity of images and the second quantity of images are provided in proportion to the user interaction probability;
detect subsequent user interactions with the images of the subset of the images corresponding with the one or more visual words; and
update the user interaction probabilities of the images of the subset of the images corresponding to the one or more visual words with the subsequent user interactions that are detected, wherein the search query comprises a language term and identifying the visual word comprises selecting a centroid in a cluster of vectors, each vector associated with an image from the collection of images that includes features indicative of the language term.

12. The system of claim 11, wherein the instructions further cause the one or more processors to:
obtain a given historical search query in the language;
parse the given historical search query to identify a visual word; and
determine a distribution of the user interaction probability corresponding to the visual word, each of the user interaction probability identifying a download rate for a corresponding visual word, the download rate being a ratio of a number of download instances for the corresponding visual word to a total number of download instances in the distribution.

13. The system of claim 12, wherein the instructions further cause the one or more processors to:
map the visual word to one or more language words or phrases of at least one language, the one or more language words or phrases being terms for a target query, wherein a mapping occurs prior to the search query being received.

14. The system of claim 11, wherein the instructions further cause the one or more processors to:
submit a plurality of images from a collection of images to a computer-operated convolutional neural network that is configured to analyze image pixel data for each of the plurality of images to identify features that relate to a visual word;
generate-multiple vectors for each of the plurality of images using the features; and
form, with the vectors to find the visual word, the cluster of vectors.

15. The system of claim 14, wherein the instructions further cause the one or more processors to:
tag each of the plurality of images with metadata identifying one or more keywords in each language that correspond to the visual word.

16. The system of claim 11, wherein the instructions further cause the one or more processors to:
obtain historical search queries in a target language, the historical search queries including interaction data that identifies subsequent user interactions with one or more image search results responsive to at least one of the historical search queries;
identify a visual word in the historical search queries of the target language;
determine one or more language terms in the target language that correspond to the visual word based on the historical search queries and the subsequent user interactions;
provide a listing of the one or more language terms in the target language in response to the search query; and
provide a plurality of translation suggestions identifying a translation from the language to the target language, the plurality of translation suggestions indicating language words in the target language that are respectively associated with one of the visual word.

17. The system of claim 16, wherein the plurality of translation suggestions include a listing of the language words that are prioritized according to how closely each of the language words corresponds to the visual word.

18. A non-transitory computer readable storage medium coupled to a processor, the non-transitory computer readable storage medium including instructions that, when executed by the processor, cause the processor to:
receive a search query identifying one or more search terms in a language for initiating an image search associated with a target language, the target language being different than the language, the search query being received from a client application via a user interface of a client device;
identify, prior to receiving the search query, a user interaction probability for a plurality of images from a collection of images that are responsive to a historical search query associated with the language, the user interaction probability indicative of an interaction distribution of images corresponding to one or more visual words, the interaction distribution of images identifying respective rates at which users of the language interact with the images corresponding to each of the one or more visual words, wherein the one or more visual words corresponds to one or more semantic concepts of the search query:
determine that the search query corresponds to the one or more visual words based on a subset of the plurality of images corresponding to the one or more visual words being responsive to a subset of the historical search query identifying the one or more search terms;
receive an identification of the subset of the images corresponding to the one or more visual words;
identify the user interaction probability for the subset of the images from the user interaction probability for the plurality of images; and
generate search results identifying a listing of the subset of the images that is prioritized according to the user interaction probability for the subset of the images, wherein the listing of the subset of the images comprises a first quantity of images based on the user interaction probability associated with a first visual word of the one or more visual words and a second quantity of images based on the user interaction probability associated with a second visual word of the one or more visual words, wherein the first quantity of images and the second quantity of images are provided in proportion to;

cause the search results to be displayed in an output section of the user interface;
detect subsequent user interactions with the images of the subset of the images corresponding with the one or more visual words; and
update the user interaction probability of the images of the subset of the images corresponding to the one or more visual words with the subsequent user interactions that are detected, wherein the search query comprises a language term and identifying the one or more visual words comprises selecting a centroid in a cluster of vectors corresponding to images from the collection of images including features indicative of a specific language term.

19. The non-transitory computer readable storage medium of claim 18, wherein the instructions further cause the processor to:
perform the image search using a search engine associated with the target language;
obtain interaction probability data associated with the language, the interaction probability data identifying a mapping between the historical search query and the user interaction probability;
identify a first visual word from the one or more visual words that corresponds to a first subset of the images having a first user interaction probability;
identify a second visual words from the one or more visual words that corresponds to a second subset of the images having a second user interaction probability; and
provide the first and second subsets of the images as search results to a user of the client device, the first subset of the images being provided at a greater proportion than that of the second subset of the images based on the first user interaction probability being greater than the second user interaction probability.

20. The non-transitory computer readable storage medium of claim 18, wherein the instructions further cause the processor to:
obtain historical search queries in a target language, the historical search queries including interaction data that identifies subsequent user interactions with one or more image search results responsive to at least one of the historical search queries;
identify the one or more visual words in the historical search queries of the target language;
determine one or more language terms in the target language that correspond to the one or more visual words based on the historical search queries and the subsequent user interactions;
provide a listing of the one or more language terms in the target language in response to the search query; and
provide a plurality of translation suggestions identifying a translation from the language to the target language, the plurality of translation suggestions indicating language words in the target language that are respectively associated with one of the one or more visual words.

* * * * *